United States Patent Office 2,885,437
Patented May 5, 1959

2,885,437

2,3-DICHLORO-2-BUTENE-1,4-BIS-(β-THIOACETIC ACID) AND PROCESS FOR PREPARING SAME

André Allais and Pierre Girault, Paris, France, assignors to UCLAF, Paris, France, a corporation of France No Drawing. Application July 23, 1957
Serial No. 673,575

Claims priority, application France July 25, 1956

4 Claims. (Cl. 260—537)

This invention relates to the 2,3-dichloro-2-butene-1,4-dithioacetic acid having the Formula I:

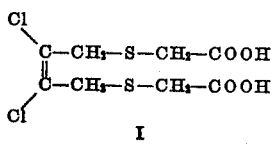

This compound has a high chlorine content (23%) and lends itself to the obtention of alcohol or polyalcohol diesters, which compounds can be used as plasticizers in reducing, on account of their high chlorine content, the inflammability of plastics in which they are incorporated. It can be also incorporated as an ester in the monomers used for the manufacture of plastics, the mixture being directly submitted to the polymerization; the product thus obtained loses its inflammability. Finally, it can be used as a polyol ester for the preparation of plastics.

In order to prepare the acid (I) according to the invention, the thioglycolic acid is reacted in an alkaline medium with 1,2,3,4-tetrachloro 2-butene (II) following the reaction equation

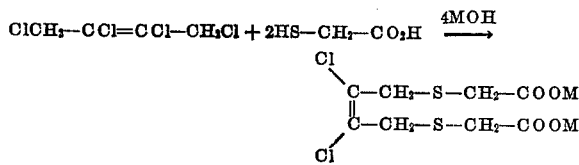

(4MOH means 4 molecules of a base or 2 molecules of an alkaline-earth metal hydroxide).

After acidification and eventually elimination of the non reacted excess of 1,2,3,4-tetrachloro 2-butene, the compound (I) crystallizes. The yields are excellent. The 1,2,3,4-tetrachloro 2-butene (II) involved in the reaction can be easily prepared from the 1,4-dichloro 2-butyne whose preparation is described in "Acetylene and Carbon Monoxide Chemistry," 1949, p. 135, J. W. Copenhaver and M. H. Bigeloww, Reinhold Publishing.

The following examples illustrate the invention without however limiting its scope. One can for instance use other bases than those indicated, for the condensation of the thioglycolic acid with the 1,2,3,4-tetrachloro 2-butene, it is also possible to vary the reaction temperature and to eliminate the non reacted chlorinated derivative by any known means without departing from the scope of the invention. Finally, one can use the 1,4-dibromo 2,3-dichloro 2-butene as a starting product. The melting points are instantaneous, determined on the Maquenne block.

EXAMPLE I

*Preparation of 1,2,3,4-tetrachloro 2-butene (II)*

A solution of 1,4-dichloro 2-butyne (100 g.) in carbon tetrachloride (200 ml.), heated to 70–75° C., is slowly added to 1750 ml of a carbon tetrachloride solution (3.4% of chlorine), the addition being made in darkness and with stirring. After introduction, the stirring is continued for another half an hour allowing the temperature to fall back to 20° C., then the carbon tetrachloride is evaporated under vacuum. 160 g. of a crude product is obtained which is purified by rectification under 10 mm. Hg vacuum. Three fractions are recovered. The first one distills at 50–75° C., the middle fraction at 75–88° C. and the last over 88° C. The latter being mostly 1,2,2,3,3,4-hexachlorobutane. While redistilling the middle fraction, one obtains 65 g. of a liquid, $E_{10}=81–84°$ C., constituted by 1,2,3,4-tetrachloro 2-butene, i.e. a 41% yield based on the 1,4-dichloro 2-butyne. The product is a colourless liquid which becomes slightly yellow when exposed to light, $d^{23°5}=1.49$; $n_D^{23°5}=1.526$; it is not miscible with water, but miscible with acetone, alcohol, ether, benzene and chloroform.

*Analysis.*—$C_4H_4Cl_4=193.9$. Calculated: C, 24.77%; H, 2.08%; Cl, 73.14%. Found: C, 24.7%; H, 2.0%; Cl, 74.1%.

This product has not been described.

EXAMPLE 2

*Preparation of 2,3-dichloro 2-butene 1,4 dithioacetic acid (I)*

10.6 g. of an 86.8% aqueous solution of thioglycolic acid are chilled at 0° C. and added dropwise, while stirring and cooling, to 20 mg. of a pure 10 N sodium hydroxide solution the temperature being maintained below 25° C. After introduction, the temperature is raised to 50° C. and without disrupting the stirring, 9.7 g. of 1,2,3,4-tetrachloro 2-butene are slowly introduced while maintaining the mixture during 4 hours at 50° C. under stirring. It is then cooled, washed with 10 ml. of chloroform in order to eliminate the non reacted 1,2,3,4-tetrachloro 2-butene and the chloroform dissolved in the aqueous phase is eliminated by distilling approximately 20 ml. water under vacuum. 20 ml. water are added to the aqueous solution of the sodium salt of the desired acid (I). One acidifies to pH 1 by adding concentrated hydrochloric acid and chills the mixture. The crystallized precipitate of the acid (I) is filtered off and washed with water. 13 g. of acid (I) (85% yield) is thus obtained, M.P. 147° C. This acid is sufficiently pure for its industrial use. It can be purified by recrystallization from 4 times its weight of water after treatment with charcoal, M.P. 153.5° C., acid index=360 (theoretical value: 367). The product is insoluble in benzene, chloroform and ether, sparingly soluble in cold water, soluble in alcohol and by warming, in acetone and water. It can be esterified according to known methods of esterification of diacids.

*Analysis.*—$C_8H_{10}O_4S_2Cl_2=305.2$. Calculated: C, 31.48%; H, 3.3%; O, 20.97%; S, 21.01%; Cl, 23.23%. Found: C, 31.6%; H, 3.4%; O, 20.6%; S, 21.2%; Cl, 23.2%.

This product has not been described in the literature.

We claim:

1. A 2,3-dichloro-2-butene-1,4-bis-(β-thioacetic acid) compound of the formula

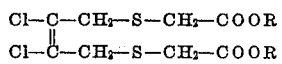

wherein R indicates a member selected from the group consisting of hydrogen and an alkali metal.

2. 2,3-dichloro-2-butene-1,4-bis-(β-thioacetic acid).

3. A process for the preparation of 2,3-dichloro 2-butene 1,4-bis-(β-thioacetic acid), which consists in reacting thioglycolic acid in an alkaline medium with 1,2, 3,4-tetrachloro 2-butene, acidifying the resulting solution of 2,3-dichloro 2-butene 1,4-bis-(β-thioacetic acid), extracting from said aqueous solution the excess of 1,2,3,4-tetrachloro 2-butene with solvents and distillation, acidifying and isolating the 2,3-dichloro 2-butene 1,4-bis-(β-thioacetic acid by filtration and recrystallization.

4. A process for the preparation of 2,3-dichloro 2-butene 1,4-bis-(β-thioacetic acid), which consists in reacting sodium thioglycolate with 1,2,3,4-tetrachloro 2-butene at a temperature of about 50° C., acidifying the resulting solution of 2,3-dichloro 2-butene 1,4-bis-(β-thioacetic acid) extracting from said aqueous solution the excess of 1,2,3,4-tetrachloro 2-butene with solvents and distillation, acidifying and isolating the 2,3-dichloro 2-butene 1,4-bis-(β-thioacetic acid) by filtration and recrystallization from water.

References Cited in the file of this patent
UNITED STATES PATENTS

| | | |
|---|---|---|
| 1,965,369 | Carothers et al. | July 3, 1934 |
| 2,602,816 | Gregory et al. | July 8, 1952 |

OTHER REFERENCES

Wille et al.: Chem. Abs., vol. 50, p. 2516 (1956).